US006695136B1

(12) United States Patent
Torres

(10) Patent No.: US 6,695,136 B1
(45) Date of Patent: Feb. 24, 2004

(54) AUTOMOBILE CASE CIGARETTE WITH ELECTRIC LIGHTER

(76) Inventor: Ernesto Torres, 205 E. 111th Pl., Los Angeles, CA (US) 90061

( * ) Notice: Subject to any disclaimer, the term of this patent is extended or adjusted under 35 U.S.C. 154(b) by 0 days.

(21) Appl. No.: 10/339,851

(22) Filed: Jan. 10, 2003

(51) Int. Cl.[7] .............................................. B65D 85/10
(52) U.S. Cl. ..................... 206/88; 206/89; 206/246; 206/249; 219/267; 219/269; 224/544
(58) Field of Search .............................. 206/85–89, 246, 206/249, 252, 255; 131/234, 351, 329; 219/261–270; 221/147; 224/539, 544

(56) References Cited

U.S. PATENT DOCUMENTS

| 2,991,875 | A | * | 7/1961 | Zarrello ....................... 206/85 |
| 3,526,751 | A | | 9/1970 | Climent |
| 3,769,492 | A | | 10/1973 | Senkewich |
| 4,220,256 | A | * | 9/1980 | Torri ........................... 219/267 |
| 4,223,687 | A | * | 9/1980 | Sandeen ....................... 206/86 |
| 4,230,224 | A | | 10/1980 | Weeks |
| 4,342,902 | A | | 8/1982 | Ping |
| 4,507,704 | A | * | 3/1985 | Chuang ........................ 206/85 |
| 4,588,076 | A | * | 5/1986 | Caputo et al. ................. 206/86 |
| 5,368,155 | A | * | 11/1994 | Ewen ........................... 206/86 |
| 6,125,082 | A | * | 9/2000 | Reid ........................... 206/249 |

* cited by examiner

*Primary Examiner*—Luan K. Bui
(74) *Attorney, Agent, or Firm*—Goldstein Law Offices, P.C.

(57) ABSTRACT

An automobile cigarette case with electrical lighter for dispensing lit cigarettes to the driver of an automobile, having a substantially rectangular case housing which is selectively mountable on the dashboard of an automobile. The case housing contains an electric lighter having an electrical cord which terminates in a lighter adaptor which may be plugged into a standard cigarette lighter outlet for powering of the electric lighter. The case with electrical lighter has a cigarette passageway which holds a plurality of cigarettes and directs and biases the cigarettes toward the electric lighter whereupon they are ignited. After the cigarette has been ignited, a coiled lighter spring is allowed to expand, and thereby raises the unlit end of the cigarette so that it partially protrudes from an opening on top of the case housing, where it may be easily grasped by a user.

9 Claims, 4 Drawing Sheets

US 6,695,136 B1

AUTOMOBILE CASE CIGARETTE WITH ELECTRIC LIGHTER

BACKGROUND OF THE INVENTION

1. Field of the Invention

The invention relates to a cigarette case with an electrical lighter which may be mounted on an automobile dashboard.

2. Description of the Related Art

Many persons who drive automobiles like to smoke cigarettes while driving. However, a driver may be distracted from the task of driving while he/she looks for a pack of cigarettes, removes a cigarette from the pack, heats a standard automobile lighter, and inhales on the cigarette while pressing the heated portion of the lighter to the end of the cigarette. Consequently, there is a need for a cigarette case which may be mounted on an automobile dashboard and which has an electric lighter contained within it which dispenses a lighted cigarette easily and safely.

A number of cigarette cases having cigarette lighters have been devised. U.S. Pat. No. 3,769,492 to Senkewich appears to show a rectangular shaped cigarette case with an electrical lighter for use in an automobile.

U.S. Pat. No. 3,526,751 to Climent appears to show a cylinder shaped cigarette case and lighter device with a plurality of holes for storing cigarettes and means to rotate the device to align it with the lighter of a vehicle.

U.S. Pat. No. 4,342,902 to Ping appears to show a cigarette case comprised of a row of sockets for storing cigarettes and includes a spiral coil for igniting the cigarettes.

While these units may be suitable for the particular purpose employed, or for general use, they would not be as suitable for the purposes of the present invention as disclosed hereafter.

SUMMARY OF THE INVENTION

It is an object of the invention to produce a cigarette case with an electric lighter which provides a driver of an automobile with a lit cigarette, without the distractions of looking for a pack of cigarettes, removing a cigarette from the pack, heating a standard automobile lighter, and igniting the cigarette by inhaling on a cigarette while pressing the heated portion of the lighter to the end of the cigarette. Accordingly, the cigarette case provides the driver of an automobile with a lit cigarette without any of the aforementioned distractions, simply by pressing down upon a switch which loads its electric lighter with a fresh cigarette while activating the lighter. A thermocouple release the cigarette once lit.

It is another object of the invention to produce a cigarette case with electric lighter which can be conveniently placed where a driver may easily reach for a cigarette. Accordingly, the cigarette case with electric lighter has two attachment brackets located upon its rear surface, whereby the case may be firmly attached to two attachment hooks which have been positioned on the automobile dashboard.

It is yet another object of the invention to produce a cigarette case which is capable of producing a number of lit cigarettes without the need for frequently refilling the case with cigarettes. Accordingly, the case holds a plurality of cigarettes, and does not require frequent refilling.

It is still another object of the invention to produce a cigarette case with electrical lighter wherein the lighter is powered by the automobile itself. Accordingly, the electric lighter has an electric cord which terminates in a standard lighter adaptor which may be plugged into a standard cigarette lighter outlet for powering the electric lighter.

It is additionally an object of the invention to produce a cigarette case which provides a driver with a lit cigarette which may be easily grasped by the user. Accordingly, the electric lighter has a small coiled spring which causes the lit cigarette to partially protrude from an opening on the top of the case, where it may be easily grasped by the user.

The invention is an automobile cigarette case with electrical lighter for dispensing lit cigarettes to the driver of an automobile, having a substantially rectangular case housing which is selectively mountable on the dashboard of an automobile. The case housing contains an electric lighter having an electrical cord which terminates in a lighter adaptor which may be plugged into a standard cigarette lighter outlet for powering of the electric lighter. The case with electrical lighter has a cigarette passageway which holds a plurality of cigarettes and directs and biases the cigarettes toward the electric lighter whereupon they are ignited. After the cigarette has been ignited, a coiled lighter spring is allowed to expand, and thereby raises the unlit end of the cigarette so that it partially protrudes from an opening on top of the case housing, where it may be easily grasped by a user.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
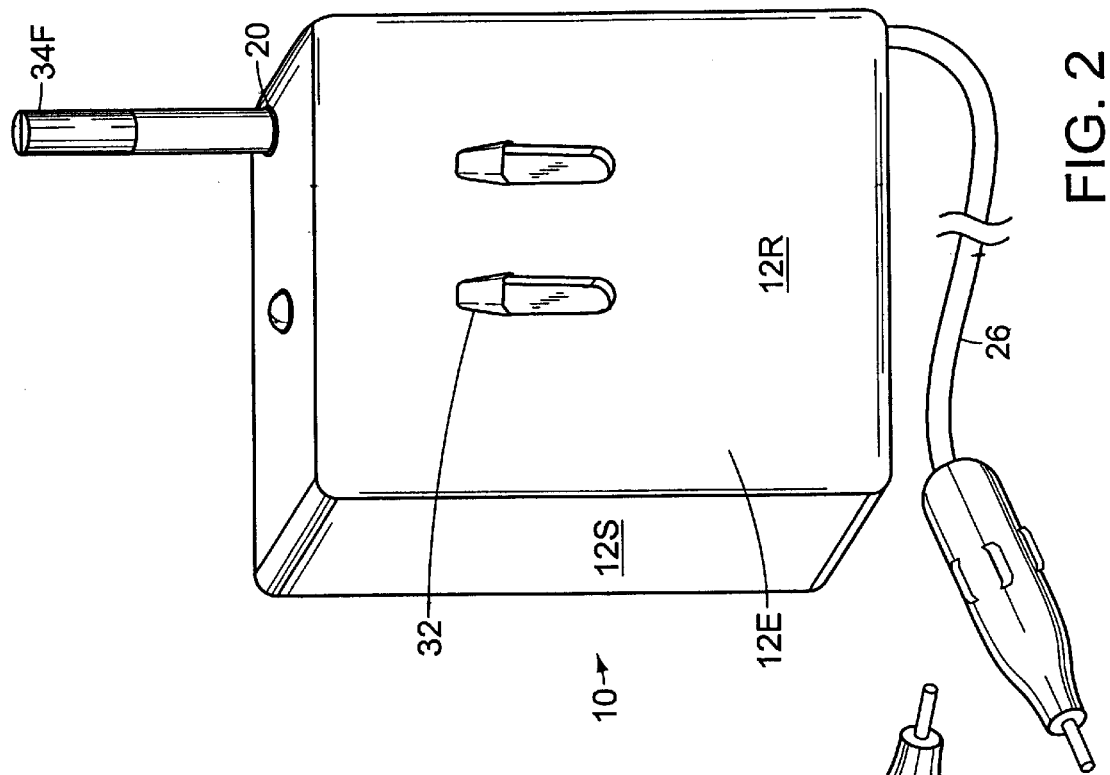
FIG. 1 is a perspective view of the cigarette case with electric lighter wherein the front surface is visible.

FIG. 1 illustrates a perspective view of the cigarette case with electric lighter 10 having a rectangular case housing 12. The case housing 12 has a front wall 12F, a rear wall 12R, two side walls 12S, a top wall 12T, and a selectively extendable bottom lid 36. The case housing 12 has a bottom portion 12B. The front wall 12F, the rear wall 12R, the top wall 12T, and the side walls 12S each have an outside surface 12E directed toward the exterior of the case 12 and an inside surface 12I directed toward the interior of the case 12. Portions of the inside surfaces 12I of the front wall 12F, the rear wall 12R, and the side wall 12S, are visible in FIG. 6. Returning once again to FIG. 1, the top wall 12T has a circular opening 20 extending fully from the outside surface 12E to the inside surface wherefrom a cigarette will partially extend after being lit. One of the side walls 12S of the case housing 12 has a switch slot 24 having a switch slot top 24T and a switch slot bottom 24B, said switch slot 24 extending fully from the outside surface 12E to the inside surface 12I of the side wall 12S. The top surface 12T of the case 12 has an indicator light 16 which is illuminated when the electric lighter 40 is activated. This may be accomplished, for example, by connecting the indicator light 16 in series with the electric lighter 40.

Figure 4:
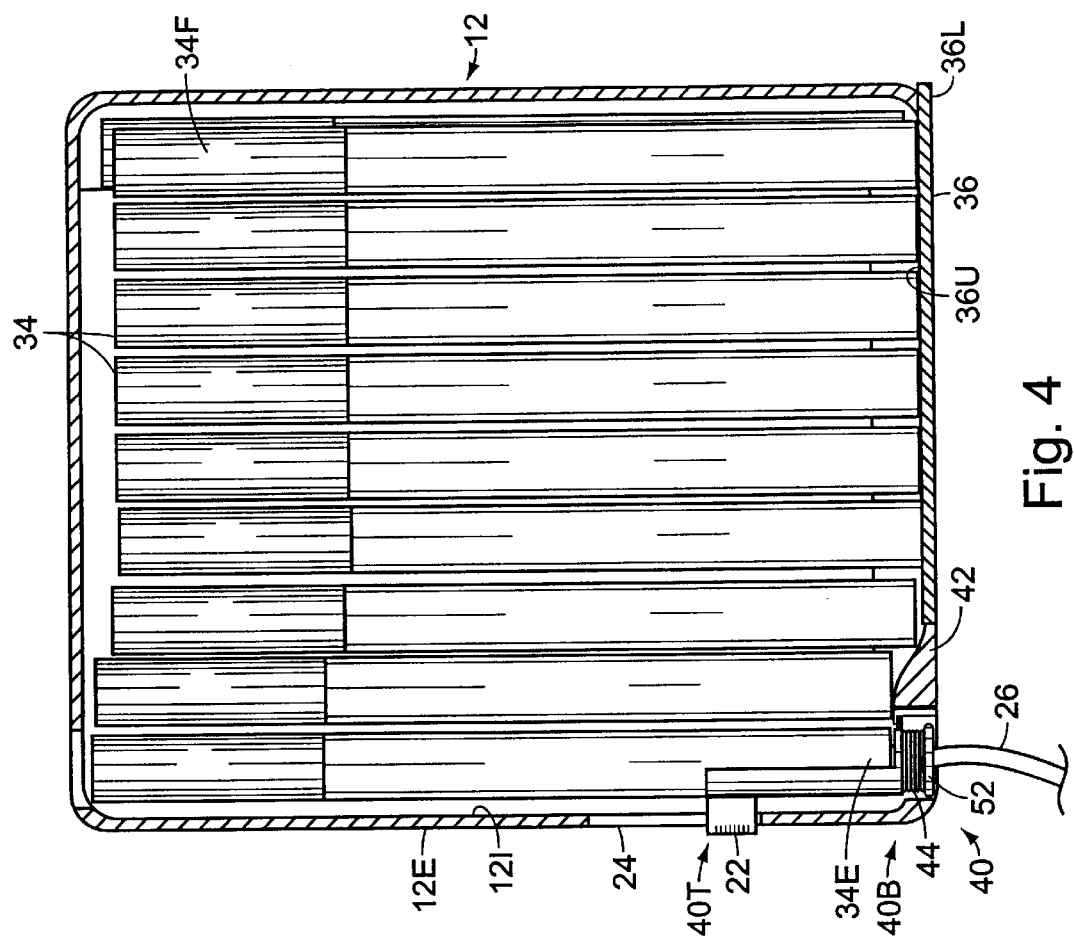
FIG. 4 is a cross-sectional view of the cigarette case with electric lighter, taken generally in the direction of line 4—4 in FIG. 1, wherein the lighter has been activated by pressing down upon the switch.

Turning momentarily to FIG. 4, the case housing 12 contains within it an electric lighter 40 having a top portion 40T, a bottom portion 40B, an electrical cord 26 extending from the bottom portion 40B, and a switch 22 located in proximity to the top portion 40T which extends through the switch slot 24 on the side surface 12S of the case housing 12, whereby said electric lighter 40 may be selectively activated by pushing down upon the switch 22 as will be described hereinafter. The electrical cord 26 terminates in a lighter adaptor 30 which may be plugged into a standard cigarette lighter outlet for powering of the electric lighter 40.

Figure 6:
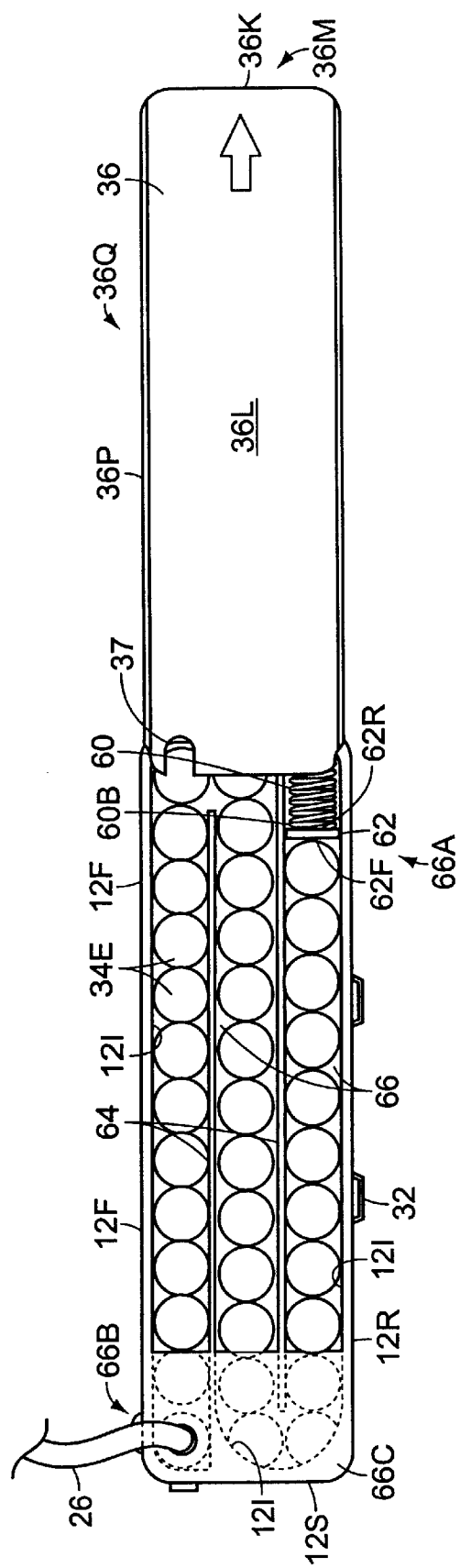
FIG. 6 is a bottom elevational view of the cigarette case wherein the bottom lid has been extended away from the bottom portion of the case housing.

The front wall 12F and the rear wall 12R of the case housing 12 each have a partially inwardly extending longitudinal groove located in proximity to the bottom portion 12B of the case housing 12 which is sized to accommodate the bottom lid 36, so that the bottom lid 36 may slide within the longitudinal grooves. The longitudinal grooves are obscured in the drawings. Turning momentarily to FIG. 6, the bottom lid 36 has an upper surface 36U, a lower surface 36L, two long sides 36Q, two short sides 36M, two peripheral edges 36P of the long sides 36Q, and two peripheral edges 36K of the short sides 36M. When the bottom lid 36 covers the bottom portion 12B, the peripheral edges 36P of the two long sides 36Q of the bottom lid 36 are bracketed by the longitudinal grooves.

The bottom lid 36 further has a lid slot 37 which is positioned to allow the bottom lid 36 to be extended fully within the longitudinal grooves of the front wall 12F and the rear wall 12R, from one side wall 12S of the case housing 12 fully to the opposing side wall 12S, without being obstructed by the electrical cord 26 which extends from the bottom portion 40B of the electric lighter 40. The lid slot 37 extends fully from the lower surface 36L to the upper surface 36U of the bottom lid 36 and extends partially into the bottom lid 36 from the peripheral edge 36K of one of the short sides 36M of the bottom lid 36.

The front surface 12F of the case housing 12 has a foldable ashtray 14, having a front wall 14F, a rear wall 14R, a bottom portion 14B, a top portion 14T, and a plurality of folding side surfaces 14S, whereby the foldable ashtray 14 may be folded substantially flat against the front wall 12F of the case housing 12, such that the front wall 14F and the rear wall 14R of the ashtray 14 are substantially parallel to one another when the foldable ashtray 14 is not being deployed. The rear wall 14R has a latch slot 17 located in proximity to the top portion 14T. The inside surface 14I of the front wall 14F has a latch 15 located in proximity to the top portion 14T which may be selectively mated with the latch slot 17 by pushing the front wall 14F of the foldable ashtray 14 toward the rear wall 14R when the foldable ashtray 14 is not needed.

Figure 2:
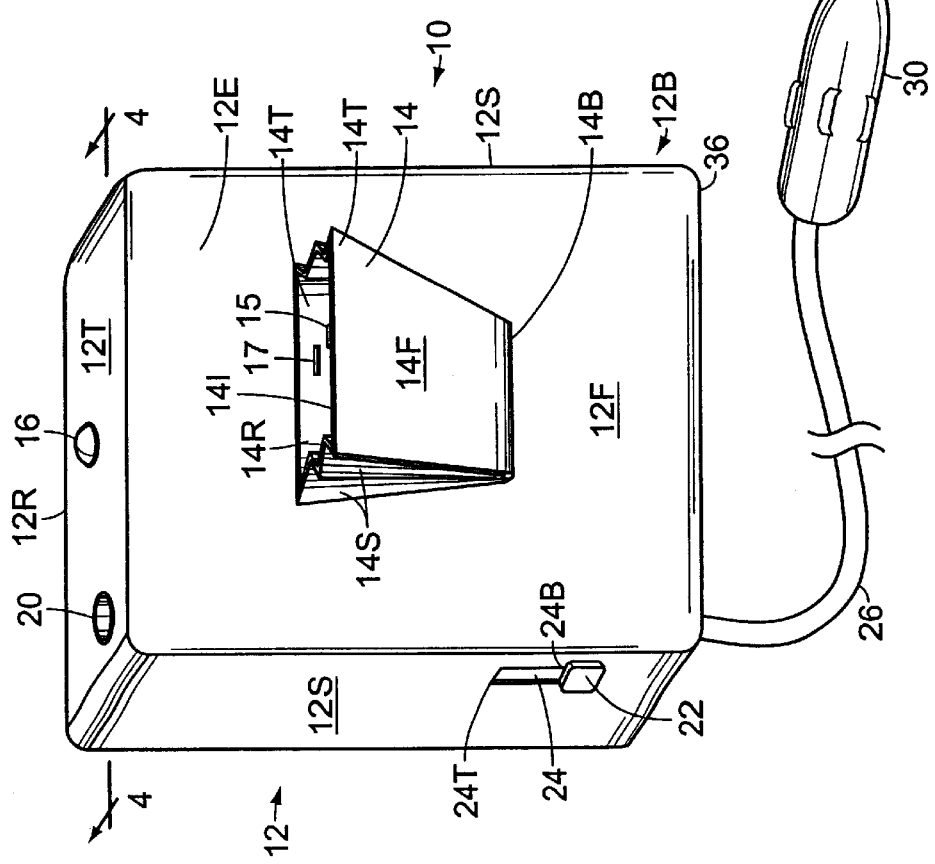
FIG. 2 is a perspective view of the cigarette case with electric lighter wherein the rear surface is visible.

FIG. 2 illustrates a perspective view of the cigarette case with electric lighter 10 wherein the rear wall 12R is visible. The case with electric lighter 10 is provided with two attachment hooks which may be positioned upon the automobile dashboard. The rear wall 12R has two attachment brackets 32 on its outside surface 12E which secure the case housing 12 to the attachment hooks positioned upon the automobile dashboard. A cigarette 34 having a filter portion 34F and a cigarette end 34E opposite to the filter portion 34F may be seen protruding from the circular opening 20. In particular, the filter portion 34F protrudes from the circular opening 20 where it may be easily grasped by the user. Non-filter cigarettes may also be dispensed by the case with electric lighter 10, in which case the end of the cigarette which is to be placed in the mouth would extend from the circular opening 20.

Figure 3:
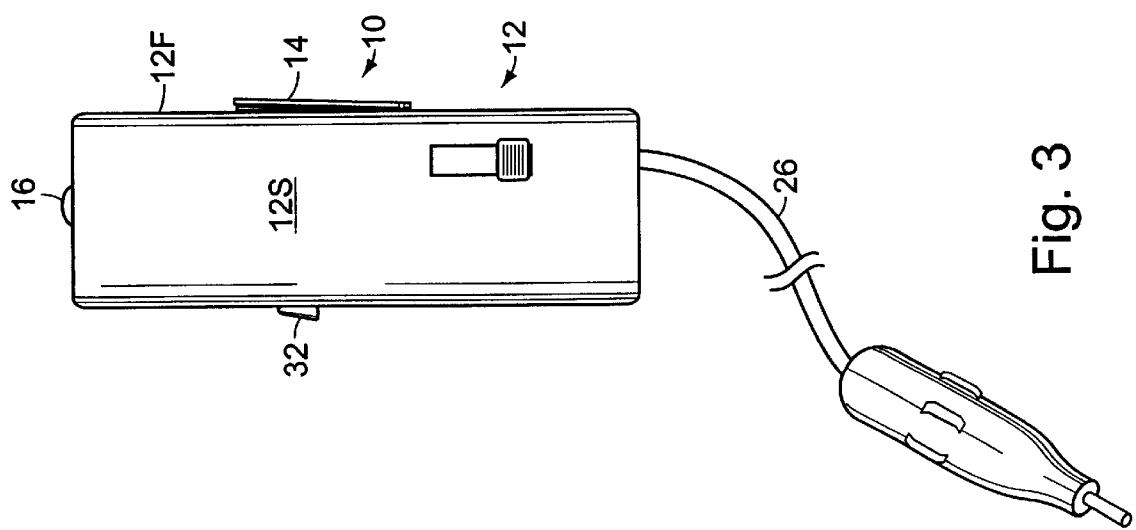
FIG. 3 is a side view of the cigarette case with electric lighter.

FIG. 3 illustrates a side view of the cigarette case with electric lighter 10 wherein the switch 22 has been depressed, thereby activating the electric lighter 40. In this view, the foldable ashtray 14 has been folded substantially flat against the front wall 12F of the case housing 12.

Turning once again to FIG. 6, the case with electric lighter 10 has a cigarette passageway 66 having two inner guide walls 64 which are parallel to the front wall 12F and to the rear wall 12R, and which extend from the top wall 12T to the bottom portion 12B of the case housing 12. The cigarette passageway 66 is defined by a first end 66A, a second end 66B, the inside surfaces 12I of the front wall 12F, the rear wall 12R, and the two side walls 12S, and by the two inner guide walls 64. The inner guide walls 64 each extend from one side wall 12S substantially but not fully to the opposing side wall 12S, to create transverse openings which keep the cigarette passageway 66 continuous and unobstructed. The transverse openings created by each of the side walls 12S are located on opposite sides of the case housing 12 to create an "S-curved" passageway 66. The cigarette passageway 66 has two curved portions 66C, each at one of the transverse openings, which allow cigarettes 34 to move easily and without friction through the cigarette passageway 66. The first end 66A of the cigarette passageway 66 has a coiled long spring 60 having a first end, and also a second end 60B which is attached to a tab 62. The tab 62 has a front surface 62F and a rear surface 62R. The second end 60B of the long spring 60 is secured to the rear surface 62R of the tab 62. The first end of the long spring 60, not visible in FIG. 6, is secured to the inside surface 12I of one of the side walls 12S. The tension in the long spring 60 presses the front surface 62F of the tab 62 against the cigarettes 34 in the cigarette passageway 66 and thereby urges them along the cigarette passageway 66 from the first end 66A toward the second end 66B. The cigarette 34 at the second end 66B of the passageway 66 is positioned upon the electric lighter 40 whereupon it is ignited, as will be described hereinafter.

Figure 5A:
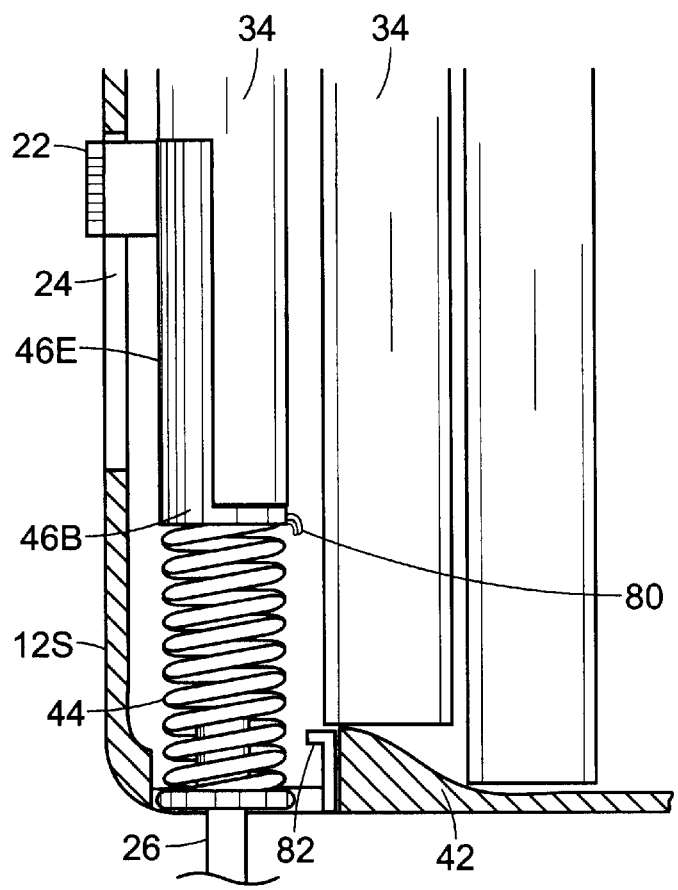
FIG. 5A is an enlarged cross-sectional view of a portion of the cigarette case with electric lighter, wherein the coiled lighter spring is extended.
Figure 5B:
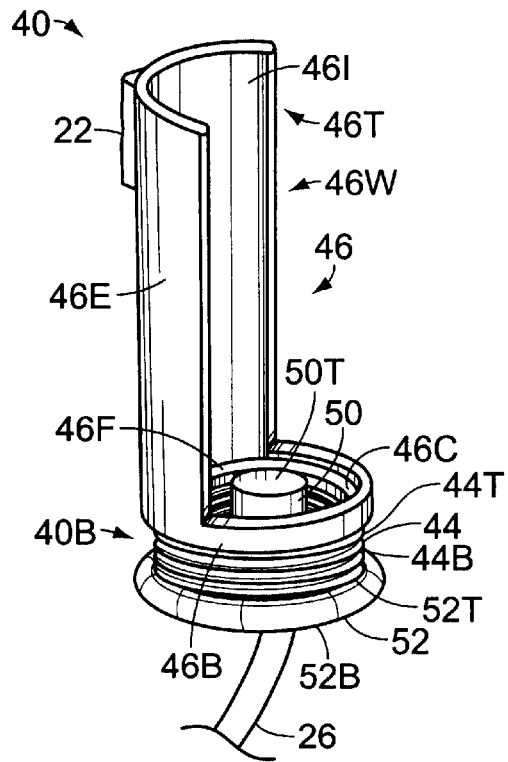
FIG. 5B is a perspective view of the electric lighter alone.

FIG. 5B illustrates a perspective view of the electric lighter 40 alone, illustrating its various components. The electric lighter 40 has a bottom portion 40B and an overlapping semicylindrical cradle 46 which cradles the cigarette 34 while it is being ignited. The bottom portion 40B comprises a lighter base 52 having a bottom surface 52B and a top surface 52T, a coiled lighter spring 44 having a top portion 44T and a bottom portion 44B, and a central cylindrical heating element 50 having a top surface 50T and a bottom surface 50B. The bottom portion 44B of the coiled lighter spring 44 and the bottom surface 50B of the heating element 50 rest upon the top surface 52T of the lighter base 52. The switch 22 is attached to the semicylindrical cradle 46, so that when the switch 22 is pressed downward, the lighter spring 44 is compressed and the lighter 40 is activated. The semicylindrical cradle 46 comprises a top portion 46T, a semicylindrical cradle bottom 46B and a semicylindrical cradle wall 46W which extends vertically upward from the semicylindrical cradle bottom 46B to the top portion 46T. The semicylindrical cradle wall 46W has an internal surface 46I and an external surface 46E. The semicylindrical cradle bottom 46B rests upon the top portion 44T of the small coiled lighter spring 44. The semicylindrical cradle 46 has a hollow for accommodating the cigarette 34 and a bottom 46B having a shoulder 46F extending partially inwardly from the cradle wall 46W for supporting the cigarette 34, whereupon the end 34E of the cigarette 34 which is being ignited rests. The shoulder 46F defines a central opening 46C, such that the top surface 50T of the heating element 50 contacts the end 34E of the cigarette 34 which is on the semicylindrical cradle 46, thereby causing it to ignite. The switch 22 is attached at the top portion 46T of the semicylindrical cradle wall 46W on its external surface 46E. Turning momentarily to FIG. 5A, the electric lighter 40 is shown to additionally comprise a thermocouple 80 attached to the semicylindrical cradle bottom 46B and a thermocouple latch 82 attached to the lighter base 52.

FIG. 4 illustrates a cross-sectional view of the cigarette case with electric lighter 10, taken generally in the direction of line 4—4 in FIG. 1, wherein the electric lighter 40 has been activated by pressing down upon the switch 22, causing it to slide from the switch slot top 24T to the switch slot bottom 24B, thereby compressing the coiled lighter spring 44. When the coiled lighter spring 44 is compressed, the thermocouple 80 is engaged by the thermocouple latch 82, holding the semicylindrical cradle 46 down such that the cigarette end 34E is against the heating element 50 while current from the electrical cord 26 causes the temperature of the heating element 50 to increase, thereby igniting the end 34E of the cigarette 34. The cigarette case with lighter 10 is also seen to comprise an inclined ramp 42. When a user desires a cigarette 34 which has been lit, the switch 22 is depressed, and the cigarette 34 which is to be lit is advanced by the long spring 60 from its position upon the inclined ramp 42 to a position wherein it is cradled by the internal surface 46I of the semicylindrical cradle wall 46W and rests upon the top surface 50T of the heating element 50, whereupon it is ignited.

FIG. 5A illustrates the electric lighter 40 after the heating element 50 has been sufficiently heated. Here, the thermocouple 80 has become bent from the increase in temperature, and is no longer capable of engaging the thermocouple latch 82, thereby allowing the coiled lighter spring 44 to expand, thereby causing the semicylindrical cradle 46 which is attached to the top portion 44T of the coiled lighter spring 44 to rise upward and thereby extrude the now-lit cigarette 34 from the circular opening 20.

In use, a user first loads the case housing 12 with cigarettes 34. In order to gain access to the cigarette passageway 66 wherein the cigarettes are loaded, the user extends the bottom lid 36 away from the bottom portion 12B by pulling the short side 36M of the bottom lid 36 which has the lid slot 37 away from the side wall 12S located in proximity to the second end 66B of the cigarette passageway 66. The bottom lid 36 slides easily within the longitudinal grooves located on the front wall 12F and the rear wall 12R, in proximity to the bottom portion 12B of the case housing. The user then compresses the long spring 60 by pushing upon the front surface 62F of the tab 62, thereby preventing the long spring 60 from blocking portions of the cigarette passageway 66. The cigarette passageway 66 may now be loaded with cigarettes 34, by extending the filter portion 34E of the cigarettes 34, one at a time, toward the inside surface 12I of the top wall 12T. After the case housing 12 has been loaded with a plurality of cigarettes 34, the bottom lid 36 is pushed back to its closed position, by pushing the short side 36M of the bottom lid 36 which has the lid slot 37 toward the side wall 12S located in proximity to the second end 66B of the cigarette passageway 66. The cigarettes 34 are thereby prevented from falling from the cigarette passageway 66. The case with electric lighter 10 is then mounted on the automobile dashboard by mating the attachment brackets 32 located on the rear wall 12R of the case housing 12 with the corresponding attachment hooks extending from the dashboard.

When a lit cigarette is desired, the user simply presses down upon the switch 22, and thereby compresses the lighter spring 44. While the lighter spring 44 is compressed, the cigarette 34 which is next to be ignited is advanced by the long spring 60 from a position wherein the cigarette 34 rests upon the inclined ramp 42 to a position wherein the cigarette 34 rests within the internal surface 46I of the semicylindrical cradle wall 46W. Compression of the lighter spring 44 also causes the thermocouple 80 to be engaged by the thermocouple latch 82. While so engaged, current supplied to the electric lighter 40 causes the temperature of the heating element 50 to increase and to ignite the end 34E of the cigarette 34. While current is flowing to the heating element 50, the indicator light 16 is illuminated, thereby alerting the user to the fact that the electric lighter 40 has been activated. After the temperature has risen sufficiently, the thermocouple 80 bends, and the thermocouple 80 extends away from the thermocouple latch 82, thereby allowing the lighter spring 44 to expand and to extrude a lit cigarette 34 from the circular opening 20. When the next lit cigarette 34 is needed, the user simply depresses the switch 22 once again, and the process is repeated.

In conclusion, herein is presented an automobile cigarette case with electric lighter for dispensing lit cigarettes to the driver of an automobile. The invention is illustrated by example in the drawing figures, and throughout the written description. It should be understood that numerous variations are possible, while adhering to the inventive concept. Such variations are contemplated as being a part of the present invention.

What is claimed is:

1. An automobile cigarette case with electric lighter for dispensing lit cigarettes to the driver of an automobile having a dashboard, comprising:

a substantially rectangular case housing having an inside surface and an outside surface, a top wall, a circular opening within the top wall, two side walls, a housing bottom, and a switch slot in the side wall near the housing bottom, the case housing substantially the height of a cigarette and sized to accommodate a plurality of cigarettes;

an electric lighter located near the side wall, said lighter including a semicylindrical cradle located immediately below the circular opening, the semicylindrical cradle having a hollow for accommodating a cigarette, a lighter spring attached between the semicylindrical cradle and the housing bottom, a heating element mounted to the housing bottom and centered within the lighter spring, and a switch extending through the switch slot and attached to the semicylindrical cradle for selectively pushing the cradle downward and activating the heating element; and a cigarette passageway located within the housing, for storing a plurality of cigarettes oriented substantially between the top surface and housing bottom, the case housing may be selectively opened to allow access to the cigarette passageway, a long spring within the cigarette passageway pushes all cigarettes within the passageway toward the semicylindrical cradle such that when the switch is pushed downward, one of the cigarettes is advanced onto the semicylindrical cradle for lighting, wherein once said cigarette is lit, the lighter spring is released and said lit cigarette is extruded upward through the circular opening.

2. The automobile cigarette case with electric lighter as recited in claim 1, wherein the case housing further has a front wall and a rear wall, and wherein the cigarette passageway has a first end, a second end, and at least one inner guide wall which is substantially parallel to the front wall and to the rear wall, extending from the inside surface of the top wall at least partially towards the housing bottom, and extending from one side wall substantially but not fully to the opposing side wall, to provide a transverse opening that makes the cigarette passageway continue from one side of the guide wall to the other side, said cigarette passageway being defined by the inside surfaces of the front wall, the rear wall, and of the two side walls, and by the at least one inner guide wall, wherein the long spring is located at the first end of the cigarette passageway, and wherein the long spring presses against the cigarettes in the cigarette passageway and thereby urges them along the cigarette passageway from the first end of the cigarette passageway toward the second end of the cigarette passageway, and wherein the cigarette fully at the second end of the passageway is pushed onto the semicylindrical cradle for lighting when the semicylindrical cradle is pushed downward.

3. The automobile cigarette case with electric lighter as recited in claim 2, wherein there are two inner guide walls within the cigarette passageway, each creating transverse openings at opposite sides of the housing.

4. The automobile cigarette case with electric lighter as recited in claim 3, wherein the electric lighter further comprises an electrical cord which extends from the electric lighter and which terminates in a lighter adapter which may be plugged into a standard cigarette lighter outlet for powering of the electric lighter, and wherein depression of the switch causes current to flow from the standard cigarette lighter outlet to the electric lighter.

5. The automobile cigarette case with electric lighter as recited in claim 4, wherein the case housing further comprises attachment brackets located on the outside surface, and wherein the cigarette case with electric lighter further comprises attachment hooks which are affixed to the automobile dashboard for selective mounting of the attachment brackets thereupon.

6. The automobile cigarette case with electric lighter as recited in claim 5, further comprising a foldable ashtray located on the front wall of the case housing, having a front wall, a rear wall, a bottom portion, a top portion, and a pair of bellowed side surfaces, whereby the foldable ashtray may be folded substantially flat against the front wall of the case housing, such that the front wall and the rear wall of the foldable ashtray are substantially parallel to each other when the foldable ashtray is stored.

7. The automobile cigarette case with electric lighter as recited in claim 6, wherein the rear wall of the foldable ashtray has a latch slot located in proximity to the top portion, and wherein the inside surface of the front wall of the foldable ashtray has a latch located in proximity to the top portion which may be selectively mated with the latch slot by pushing the front wall of the foldable ashtray toward the rear wall when the foldable ashtray is not being deployed.

8. The automobile cigarette case with electric lighter as recited in claim 7, wherein the top surface of the case further comprises an indicator light which is illuminated when the electric lighter is activated.

9. A method of using an automobile cigarette case with electric lighter for dispensing lit cigarettes to the driver of an automobile having a dashboard, said cigarette case with electric lighter having a substantially rectangular case housing having an outside surface and an inside surface, a top wall, a circular opening within the top wall, two side walls, a housing bottom, and a switch slot in one of the side walls near the housing bottom, said cigarette case further having an electric lighter located near the switch slot, the lighter including a semicylindrical cradle located immediately below the circular opening, a lighter spring attached between the semicylindrical cradle and the housing bottom, a heating element mounted to the housing bottom and centered within the lighter spring, and a switch extending through the switch slot and attached to the semicylindrical cradle for selectively pushing the cradle downward and activating the heating element, said cigarette case further having a cigarette passageway located within the housing, for storing a plurality of cigarettes oriented substantially between the top surface and housing bottom, the cigarette passageway having a long spring within the cigarette passageway which pushes all cigarettes within the passageway toward the semicylindrical cradle, comprising the steps of:

a) opening the housing bottom to gain access to the cigarette passageway;

b) loading the cigarette passageway with cigarettes, by extending the cigarettes, one at a time, toward the inside surface of the top wall;

c) closing the housing bottom, thereby preventing the loaded cigarettes from falling from the cigarette passageway;

d) mounting the case with cigarette lighter to the automobile dashboard;

e) activating the electric lighter and compressing the lighter spring by pressing down upon the switch;

f) loading one of the cigarettes onto the semicylindrical cradle by advancing all cigarettes within the cigarette passageway toward the semicylindrical cradle by the long spring;

g) lighting one of the cigarettes with the electric lighter;

h) partially extruding the lit cigarette through the circular opening by expanding the lighter spring;

i) removing the lit cigarette from the circular opening; and j) repeating steps (e) through (i) when the next lit cigarette is needed.

\* \* \* \* \*